R. A. CAMPBELL.
TIRE PRESSURE GAGE.
APPLICATION FILED JAN. 10, 1913.

1,129,450.

Patented Feb. 23, 1915.

WITNESSES

INVENTOR
ROBERT A. CAMPBELL
BY
ATTORNEYS

UNITED STATES PATENT OFFICE.

ROBERT A. CAMPBELL, OF MINNEAPOLIS, MINNESOTA.

TIRE-PRESSURE GAGE.

1,129,450.   Specification of Letters Patent.   Patented Feb. 23, 1915.

Application filed January 10, 1913. Serial No. 741,196.

*To all whom it may concern:*

Be it known that I, ROBERT A. CAMPBELL, a citizen of the United States, resident of Minneapolis, Hennepin county, Minnesota, have invented certain new and useful Improvements in Tire-Pressure Gages, of which the following is a specification.

In the operation of an automobile or other pneumatic tired vehicle, it has been customary in testing the pressure on the tire to remove the cap and apply temporarily a gage thereto having means for indicating the pressure per square inch in the tire. The testing of four tires necessarily means the removal of four caps and the application of the gage thereto and its removal from one tire to another, and the average owner of a car will hardly ever go to the trouble and labor of testing the tire pressure in this way. Oftentimes by using a gage a leak might be detected before the car leaves the garage.

The object, therefore, of my invention is to provide an indicating device adapted for permanent attachment to the tire by means of which the driver of the car can almost instantly ascertain the tire pressure without moving the gage from one tire to another.

A further object is to provide a device of simple, compact construction and one which can be easily and quickly applied to the nipple of any ordinary type of tire valve.

The invention consists generally in various constructions and combinations, all as hereinafter described and particularly pointed out in the claims.

Figure 3:
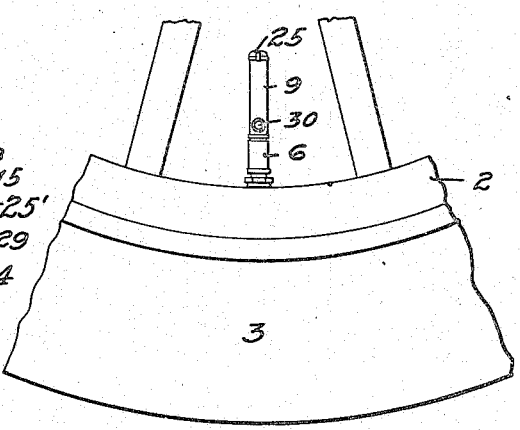
Figure 1:
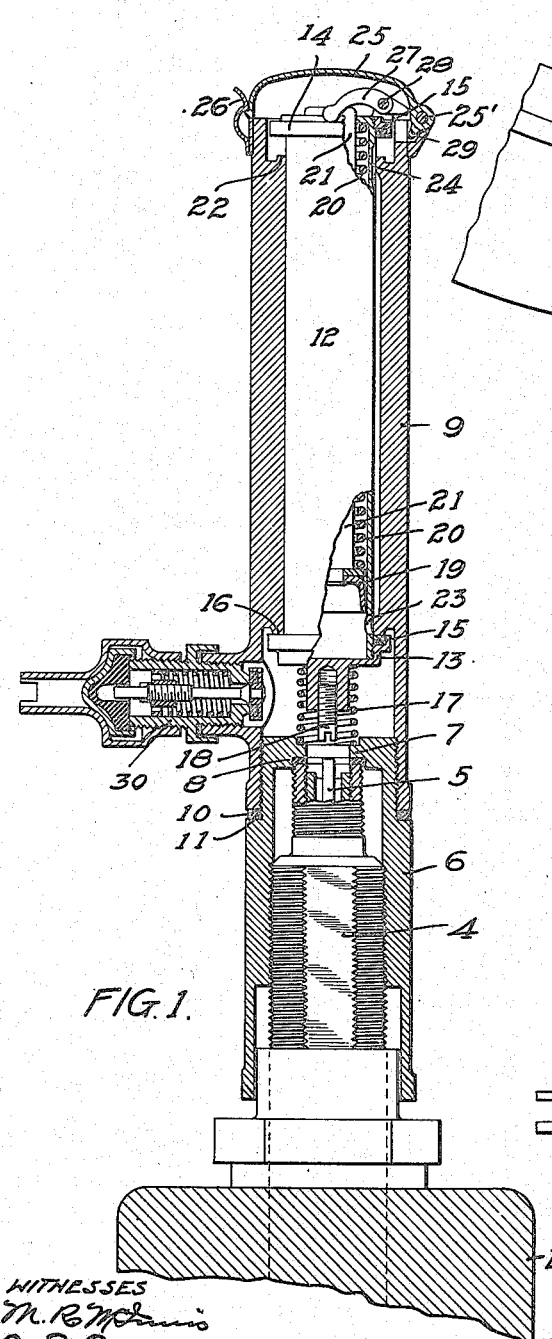
Figure 2:
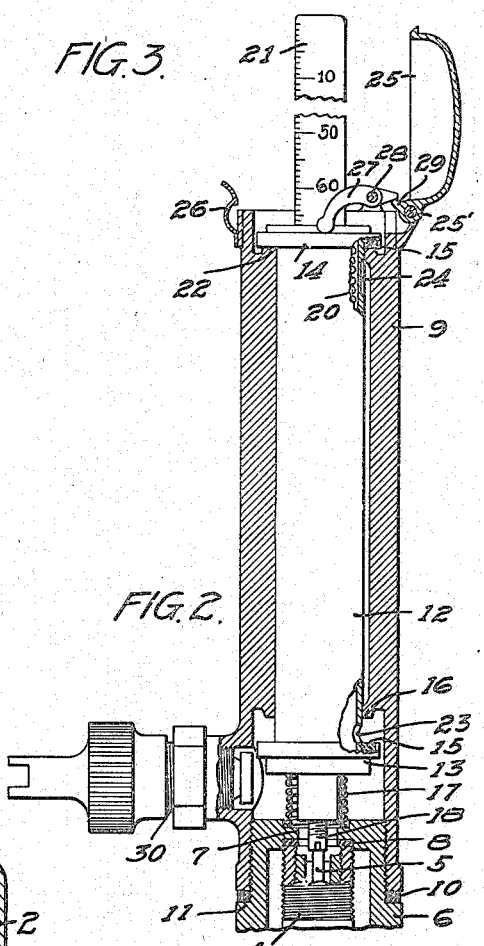

In the accompanying drawings forming part of this specification, Figure 1 is a longitudinal sectional view through a portion of a wheel rim and my improved tire pressure gage mounted thereon, Fig. 2 is a detail sectional view showing the gage open and indicating the pressure in the tire, Fig. 3 is a side view of a portion of a wheel rim and tire, showing the position of the gage on the rim.

In the drawing, 2 represents a wheel rim and 3 a tire, both of ordinary construction. 4 is a valve nipple, having an air valve 5 of ordinary construction.

6 represents a sleeve or casing, interiorly threaded to engage the exteriorly threaded nipple. This sleeve takes the place of the ordinary cylindrical cap that is usually found on the nipples of pneumatic tires. It is provided at its outer end with an inwardly projecting annular flange 7 that is seated on the outer end of the nipple and forms an air-tight joint therewith by means of a packing ring 8. The outer end of the sleeve 6 is exteriorly threaded to receive the interiorly threaded end of a tube 9 which is seated against a packing ring 10 carried by a shoulder 11 formed on said sleeve. Within the tube 9 is a pressure gage comprising a cylinder 12 having heads 13 and 14. The head 13 has a packing ring 15 seated against a flange 16 formed on the tube 9 and normally held in yielding contact with said flange by a spring 17 that is supported on the flange 7. A pin 18 is carried by the head 13 and adapted to contact with the valve 5 so that when the cylinder is forced down a predetermined distance the air valve 5 will be opened to allow the escape of the air pressure from the inner tube of the tire. Within the cylinder 12 is a plunger 19 held in a depressed position by a spring 20, said plunger carrying a graduated bar 21 that is vertically slidable through a slot in the head 14. The head 14 has a gasket similar to the one provided for the head 13 and forms an air-tight joint with a seat 22, and the wall of the cylinder has a port 23 and a duct 24 therein leading to the space within the cylinder 12 below and above the plunger. This port and duct are for the purpose of allowing the escape of the air from the cylinder after the reading of the gage.

The outer end of the tube 9 is open and provided with a cover or cap 25 hinged at 25' and normally held in its closed position by a spring catch 26. A lever 27 is pivoted at 28 and has one end adapted to bear on the head 14 while its opposite end projects into the path of a lug 29 mounted on the cap 25 near its pivot. When the cover is opened, the long arm of the lever 27 will be forced downward, moving the cap 14 down to its seat 22 and unseating the cap 13, thereby exposing the port 23 and closing the duct 24. The pin 18 will contact with the stem 5 and open the valve, allowing the air pressure to flow into the tube 9, enter the port 23 and raise the plunger. Obviously, this movement of the plunger will expose the graduations on the bar 21 and indicate to the operator the air pressure in the tire. As soon as the cover 25 is released, the tube 12 will be allowed to return to its normal position, closing the port 23 and allowing the plunger to be retracted by its spring to its normal position, when the operator may then close the cover and repeat the operation on another tire.

At one side of the tube 9 I prefer to provide the usual valve 30 having means for attachment to a hose for filling the tire with air pressure.

In various ways the manner of mounting the gage on the nipple of the tire valve may be modified and still be within the scope of my invention.

I claim as my invention:—

1. The combination, with a pneumatic tire and nipple and valve therefor, of a casing permanently mounted on said nipple, an air pressure gage arranged within said casing and including a plunger and graduated bar, a cover hinged on said casing and normally concealing said pressure gage, a lever pivoted on said casing and operated by the opening of said cover, and means actuated by the movement of said lever for opening said valve to release the air under pressure and actuate said plunger.

2. The combination, with a tire valve, of a casing mounted thereon and having an air chamber, a pressure indicating device within said casing, a hinged cover normally closing said casing and concealing said indicating device, and means actuated by the opening of said cover for establishing communication between the tire and said indicating device to indicate the fluid pressure in the tire.

3. The combination, with a tire valve, of a casing mounted thereon and having an air chamber, a pressure indicating device within said casing, a hinged cover closing said casing and normally concealing said indicating device, a lever actuated by the opening of said cover, and means operated by the movement of said lever for establishing communication between the tire and said indicating device, for the purpose specified.

4. The combination, with a tire valve, of a casing mounted thereon having a pressure indicating device therein, a cover normally concealing said indicating device, and means actuated by the opening of said cover for establishing communication between the tire and said indicating device, to indicate the fluid pressure in the tire.

5. The combination, with a tire valve, of a casing mounted thereon, a cover for said casing, an indicating device within said casing and communicating with said valve, and means actuated by the opening of said cover for opening said valve to admit fluid under pressure to said indicating device.

6. The combination, with a tire valve, of a casing mounted thereon, a pressure gage arranged within said casing and having a graduated member adapted to be projected outside said casing when fluid under pressure is admitted through said valve to said casing, a cover normally closing said casing and concealing said graduated member and adapted, when opened, to open the tire valve to release the air through said valve to said pressure gage.

In witness whereof, I have hereunto set my hand this 31st day of December, 1912.

ROBERT A. CAMPBELL.

Witnesses:
GENEVIEVE E. SORENSEN,
EDWARD A. PAUL.